United States Patent
Aslan et al.

(10) Patent No.: US 11,649,911 B2
(45) Date of Patent: May 16, 2023

(54) SPIRAL HOSE

(71) Applicant: Eaton Intelligent Power Limited, Dublin (IE)

(72) Inventors: Kubra Aslan, Umraniye/Istanbul (TR); Dipak Singh, Pune (IN); Salih Karayagiz, Istanbul (TR); Nivedita Singh, Pune (IN); Bjoern Theberath, Kuppenheim (DE); Nida Aras, Corlu/Tekirdag (TR)

(73) Assignee: DANFOSS POWER SOLUTIONS II TECHNOLOGY A/S, Nordborg (DK)

( * ) Notice: Subject to any disclaimer, the term of this patent is extended or adjusted under 35 U.S.C. 154(b) by 151 days.

(21) Appl. No.: 17/312,973

(22) PCT Filed: Dec. 10, 2019

(86) PCT No.: PCT/EP2019/084494
§ 371 (c)(1),
(2) Date: Jun. 11, 2021

(87) PCT Pub. No.: WO2020/120505
PCT Pub. Date: Jun. 18, 2020

(65) Prior Publication Data
US 2022/0049799 A1 Feb. 17, 2022

(30) Foreign Application Priority Data

Dec. 13, 2018 (IN) .............................. 201811047243
May 7, 2019 (GB) ...................................... 1906359

(51) Int. Cl.
*F16L 11/08* (2006.01)
(52) U.S. Cl.
CPC .................................. *F16L 11/083* (2013.01)

(58) Field of Classification Search
CPC ....................................................... F16L 11/083
See application file for complete search history.

(56) References Cited

U.S. PATENT DOCUMENTS 3,212,528 A * 10/1965 Haas ...................... F16L 11/088
138/134
4,175,992 A * 11/1979 Grawey .................. B32B 25/10
156/149

(Continued)

FOREIGN PATENT DOCUMENTS

| CN | 203421352 U | 2/2014 |
| CN | 204004868 U | 12/2014 |

(Continued)

*Primary Examiner* — Craig M Schneider
*Assistant Examiner* — David R Deal
(74) *Attorney, Agent, or Firm* — Leydig, Voit & Mayer, Ltd.

(57) ABSTRACT

A spiral hose includes: a tube with a first wall thickness; a first reinforcement package, arranged around a circumference of the tube, having a first rubber layer embedding at least one set of a first and second layer of wire wound in a helical path around the tube, a winding direction of the first layer being opposite from a winding direction of the second layer, which first reinforcement package has a first package thickness; a second reinforcement package, arranged around a circumference of the first reinforcement package, having a second rubber layer embedding at least a second set of a third and fourth layer of wire wound in a helical path around the first reinforcement package, a winding direction of the third layer being opposite from a winding direction of the fourth layer, which second reinforcement package has a second package thickness; and a cover layer.

7 Claims, 1 Drawing Sheet

(56) References Cited

U.S. PATENT DOCUMENTS

| | | | | |
|---|---|---|---|---|
| 4,380,252 A | * | 4/1983 | Gray | F16L 11/086 138/132 |
| 4,553,568 A | * | 11/1985 | Piccoli | B29C 48/21 138/125 |
| 4,830,059 A | * | 5/1989 | Silberstang | F16L 11/10 138/172 |
| 5,538,513 A | * | 7/1996 | Okajima | A61M 25/0012 138/124 |
| 6,000,434 A | * | 12/1999 | Winter | F16L 11/115 156/143 |
| 6,415,825 B1 | | 7/2002 | Dupoiron et al. | |
| 10,458,573 B2 | * | 10/2019 | Burrowes | B32B 25/12 |
| 2009/0236004 A1 | * | 9/2009 | Jani | F16L 11/083 138/125 |
| 2011/0214773 A1 | | 9/2011 | Hamachi et al. | |
| 2011/0290362 A1 | | 12/2011 | Lee et al. | |
| 2012/0119032 A1 | * | 5/2012 | Benassi | F16L 11/20 156/190 |
| 2014/0116564 A1 | * | 5/2014 | McNab | E21B 17/1035 138/137 |
| 2017/0122467 A1 | * | 5/2017 | Demanze | F16L 11/02 |

FOREIGN PATENT DOCUMENTS

| | | |
|---|---|---|
| CN | 107178665 A | 9/2017 |
| DE | 1650142 A1 | 9/1970 |
| EP | 3045794 A1 | 7/2016 |
| GB | 953833 A | 4/1964 |
| GB | 1229612 A | 4/1971 |

\* cited by examiner

SPIRAL HOSE

CROSS-REFERENCE TO PRIOR APPLICATIONS

This application is a U.S. National Phase application under 35 U.S.C. § 371 of International Application No. PCT/EP2019/084494, filed on Dec. 10, 2019, and claims benefit to Indian Patent Application No. IN 201811047243, filed on Dec. 13, 2018 and to British Patent Application No. GB 1906359.3, May 7, 2019. The International Application was published in English on Jun. 18, 2020 as WO 2020/120505 under PCT Article 21(2).

FIELD

The invention relates to a spiral hose, comprising:
a tube with a first wall thickness ($t_1$);
a first reinforcement package, arranged around the circumference of the tube, comprising a first rubber layer embedding at least one set of a first and second layer of wire wound in a helical path around the tube, wherein the winding direction of the first layer is opposite from the winding direction of the second layer, which first reinforcement package has a first package thickness ($t_{R1}$);
a second reinforcement package, arranged around the circumference of the first reinforcement package, comprising a second rubber layer embedding at least a second set of a third and fourth layer of wire wound in a helical path around the first reinforcement package, wherein the winding direction of the third layer is opposite from the winding direction of the fourth layer, which second reinforcement package has a second package thickness ($t_{R2}$); and
a cover layer, arranged around the circumference of the second reinforcement package, with a cover package thickness ($t_C$).

BACKGROUND

Spiral hoses are used in order to transport fluids under pressure. In order to obtain a hose which is able to sustain the forces observed in high pressure applications, it is known to provide the hose with reinforcements in the hose wall, e.g. from US 2011/290362 A1. The inner tube of such a hose is enveloped with reinforcement layers, which comprise wire layers embedded in rubber. These layers are covered by a cover layer to protect the reinforcement layers against wear and abrasion.

The reinforcement layers improve the strength of the tube, such that higher pressures can be sustained. However, the reinforcement layers also decrease the flexibility of the hose. Furthermore, if the reinforcement layers are reduced to provide more flexibility, the life span of the hose also reduces.

SUMMARY

In an embodiment, the present invention provides a spiral hose, comprising: a tube with a first wall thickness; a first reinforcement package, arranged around a circumference of the tube, comprising a first rubber layer embedding at least one set of a first and second layer of wire wound in a helical path around the tube, a winding direction of the first layer being opposite from a winding direction of the second layer, which first reinforcement package has a first package thickness; a second reinforcement package, arranged around a circumference of the first reinforcement package, comprising a second rubber layer embedding at least a second set of a third and fourth layer of wire wound in a helical path around the first reinforcement package, a winding direction of the third layer being opposite from a winding direction of the fourth layer, which second reinforcement package has a second package thickness; and a cover layer, arranged around a circumference of the second reinforcement package, with a cover package thickness, wherein a diameter of the wires in the second reinforcement package is smaller than a diameter of the wires in the first reinforcement package.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
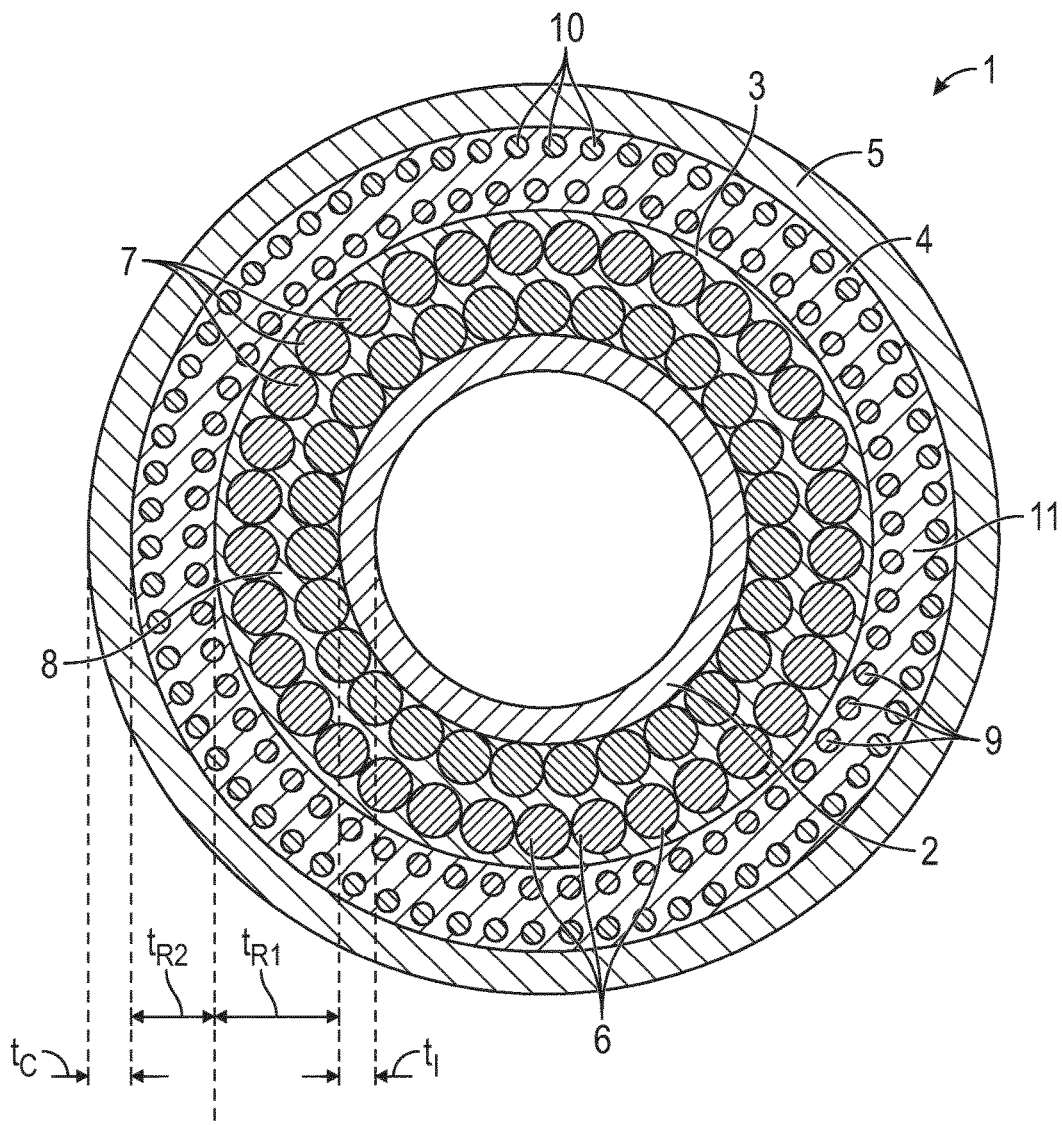
FIG. 1 shows a schematic cross-sectional view of a spiral hose according to the invention.

In an embodiment, the present invention alleviates or even obviates the above mentioned drawbacks of the prior art.

In an embodiment, the present invention provides a spiral hose as described herein, which is characterized in that the diameter of the wires in the second reinforcement package is smaller than the diameter of the wires in the first reinforcement package.

It has been found that choosing the diameter of the wires in the second reinforcement package smaller than the diameter in the first reinforcement package will result in an increase in the flexibility of the hose, which will make the hose tend to set in position properly, while maintaining a high burst strength and low chance of abrasion.

The first reinforcement package will typically comprise one or two sets, resulting in two or four layers of wire in the first reinforcement package respectively.

In being wound around the tube, the direction of the first and second layer of wire are opposite, e.g. the first layer is left-handed, whereas the second layer is right-handed, or vice versa. Preferably, the outer wire layer of the first reinforcement package also has a direction opposite to the inner wire layer of the second reinforcement package.

The thickness of the tube $t_1$ is preferably larger than 1.1 mm in order to further prevent a burst of the tube.

In a preferred embodiment of the spiral hose according to the invention, the difference in the diameter between the wires in the first and second reinforcement package is at least 0.09 mm.

It has been discovered that the above effect is especially found in a profound way if the size difference is at least 0.09 mm.

In a further preferred embodiment of the spiral hose according to the invention, at least one and preferably all of the layers of wire of the second reinforcement package has a wire packing of between 50% and 80%.

A relatively low wire packing (i.e. 80% or less) results in a spiral hose with a further increased flexibility. Below a wire packing of 50%, the reinforcing effect of the wire decreases substantially.

In this respect, the wire packing is a measure of the coverage by the wires of a surface. A surface completely covered by the wires will have a wire packing of 100%, while, without the wire layer present, the wire packing will be 0%.

In another embodiment of the spiral hose according to the invention, the tube gauge, defined as $(t_1)/(t_1+t_{R1}+t_{R2}+t_C)$, is between 12% and 17%.

If the tube gauge is chosen smaller, the chance of burst increases significantly, whereas with a larger tube gauge, the practicality of the hose will decrease, due to the relatively large wall thickness and consequently large outer diameter and increased stiffness.

In a further embodiment of the spiral hose according to the invention, at least one of the tube and the cover layer is made of rubber.

In a still a further embodiment of the spiral hose according to the invention, at least one of the layers of wire is made of steel wire.

These and other features of the invention will be elucidated in conjunction with the accompanying drawings.

Figure 2:
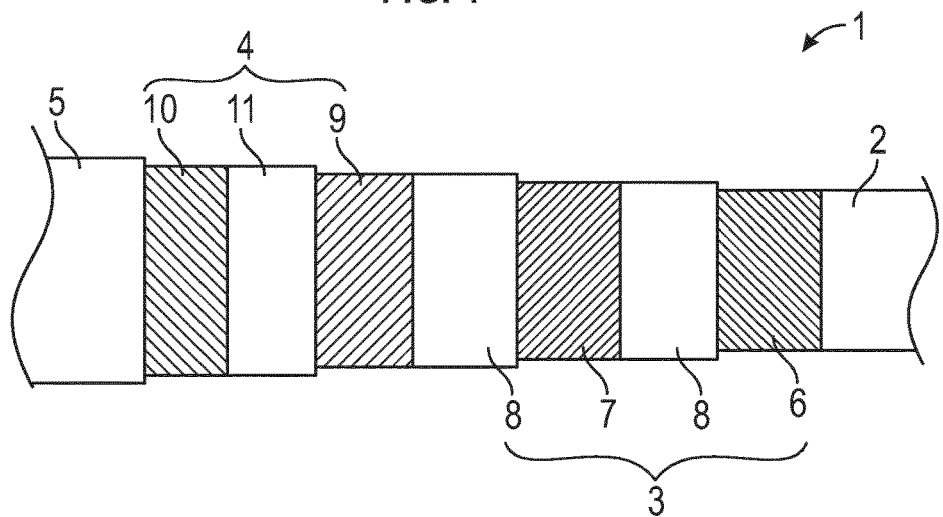
FIG. 2 shows a cut-away side view of the spiral hose according to FIG. 1.

FIGS. 1 and 2 disclose a spiral hose 1, made up from a rubber tube 2 with a thickness $t_1$, a first reinforcement package 3 with a thickness $t_{R1}$, a second reinforcement package 4 with a thickness $t_{R2}$ and a rubber cover layer 5 with a thickness $t_C$.

The first reinforcement package 3 comprises a set 6, 7 of steel wires which are embedded in rubber 2, 8. Wires 6, 7 are wound in a helical path and have an opposite winding direction relative to each other.

second reinforcement package 4 comprises steel wires 9, 10 which are also embedded in rubber 5, 8, 11. Wires 9, 10 are also wound in a helical path and have an opposite winding direction relative to each other.

The diameter of the wires 9, 10 is 0.09 mm or more smaller than the diameter of the wires 6, 7, and the windings of the wires 9, 10 are spaced apart from each other to obtain a wire packing between 50% and 80% of the adjacent rubber 11.

EXAMPLE 1

A hose commercially available under the name FC500-16 was compared to an embodiment of a hose according to the invention.

The hose FC500-16 has two reinforcement layers with each two layers of wire, each having a diameter of 0.56 mm. The wire packing of the first, second, third and fourth wire layer are respectively 93%, 88%, 81%, 79%.

The embodiment of the hose according to the invention also has two reinforcement layers. The first reinforcement package has a set of wire layers with a thickness of 0.65 mm. The second reinforcement package has a set of wire layers with a thickness of 0.56 mm. The wire packing of the first, second, third and fourth wire layer are respectively 90%, 89%, 69%, 66%.

The FC500-16 hose and the embodiment according to the invention were both tested for burst strength and flexibility. The FC500-16 has a burst strength of 1486 bar and a flexibility of 162 N. The embodiment according to the invention has a burst strength of 1541 bar and a flexibility of 127 N.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A spiral hose, comprising:
   a tube with a first wall thickness;
   a first reinforcement package, arranged around a circumference of the tube, comprising a first rubber layer embedding at least one set of a first and second layer of wire wound in a helical path around the tube, a winding direction of the first layer being opposite from a winding direction of the second layer, which first reinforcement package has a first package thickness;
   a second reinforcement package, arranged around a circumference of the first reinforcement package, comprising a second rubber layer embedding at least a second set of a third and fourth layer of wire wound in a helical path around the first reinforcement package, a winding direction of the third layer being opposite from a winding direction of the fourth layer, which second reinforcement package has a second package thickness; and
   a cover layer, arranged around a circumference of the second reinforcement package, with a cover package thickness,
   wherein
   a diameter of the wires in the second reinforcement package is smaller than a diameter of the wires in the first reinforcement package.

2. The spiral hose of claim 1, wherein a difference in the diameter between the wires in the first and second reinforcement layer is at least 0.09 mm.

3. The spiral hose of claim 1, wherein at least one of the layers of wire of the second reinforcement package has wire packing of between 50% and 80%.

4. The spiral hose of claim 3, wherein all of the layers of wire of the second reinforcement package have wire packing of between 50% and 80%.

5. The spiral hose of claim 1, wherein a tube gauge, defined as $(t_1)/(t_1+t_{R1}+t_{R2}+t_C)$, is between 12% and 17%.

6. The spiral hose of claim 1, wherein at least one of the tube and the cover layer comprises rubber.

7. The spiral hose of claim 1, wherein at least one of the layers of wire comprises steel wire.

\* \* \* \* \*